May 9, 1944.　　　　C. M. SEMLER　　　　2,348,229
VULCANIZING APPARATUS
Filed March 18, 1941　　　　4 Sheets-Sheet 2
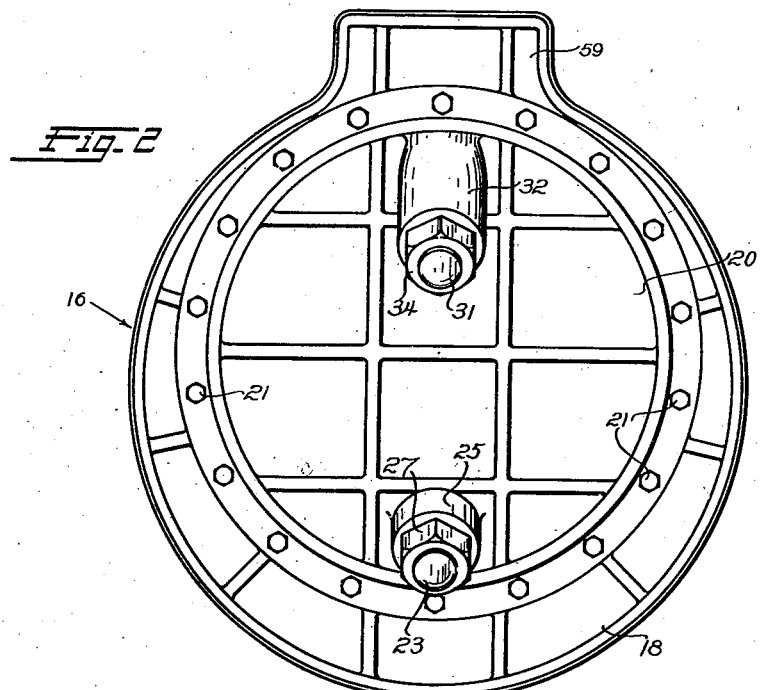
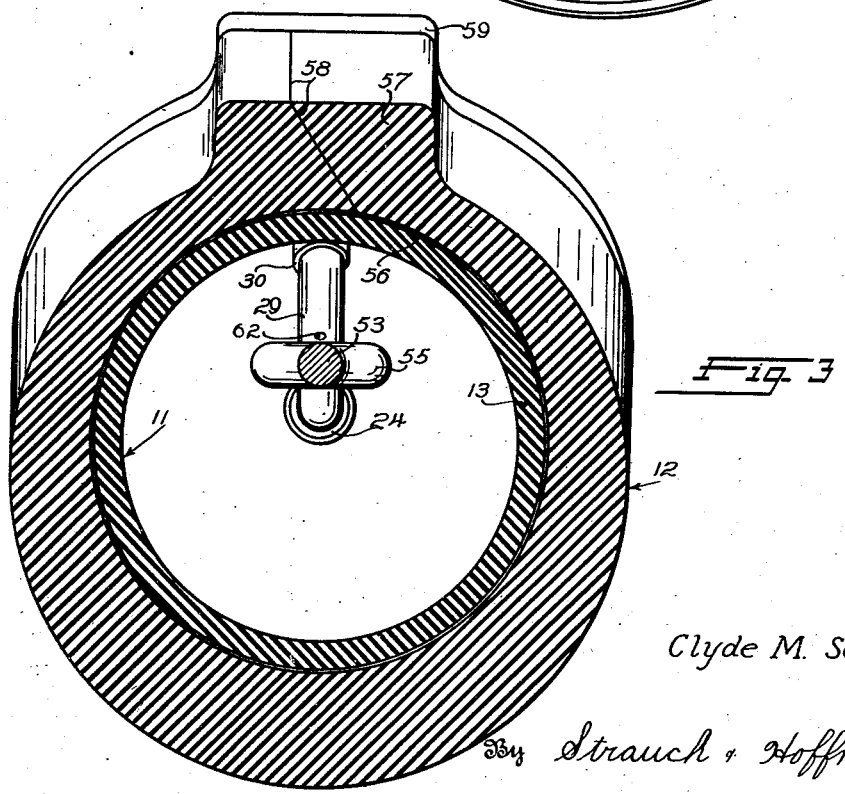
Inventor
Clyde M. Semler
By Strauch & Hoffman
Attorneys

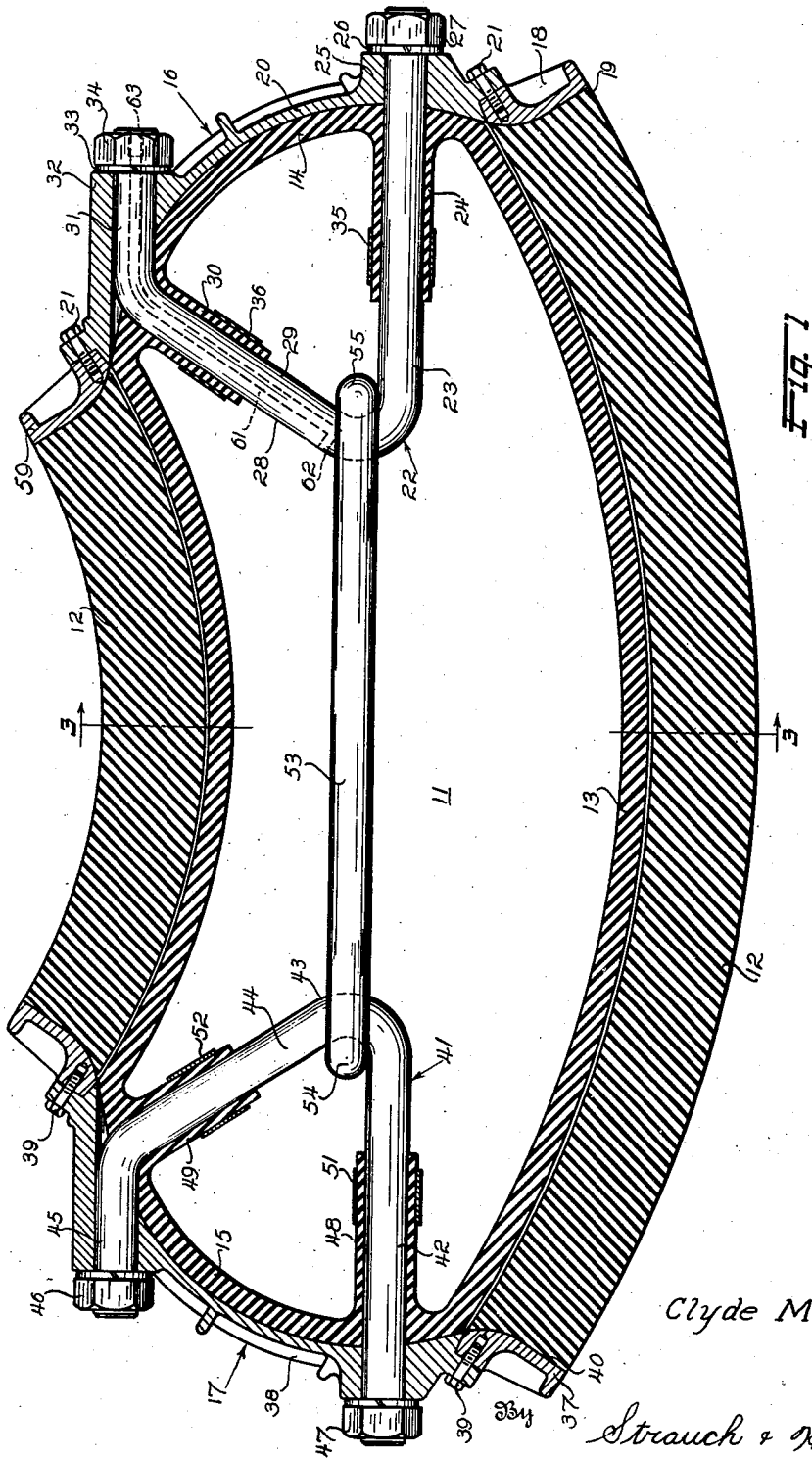

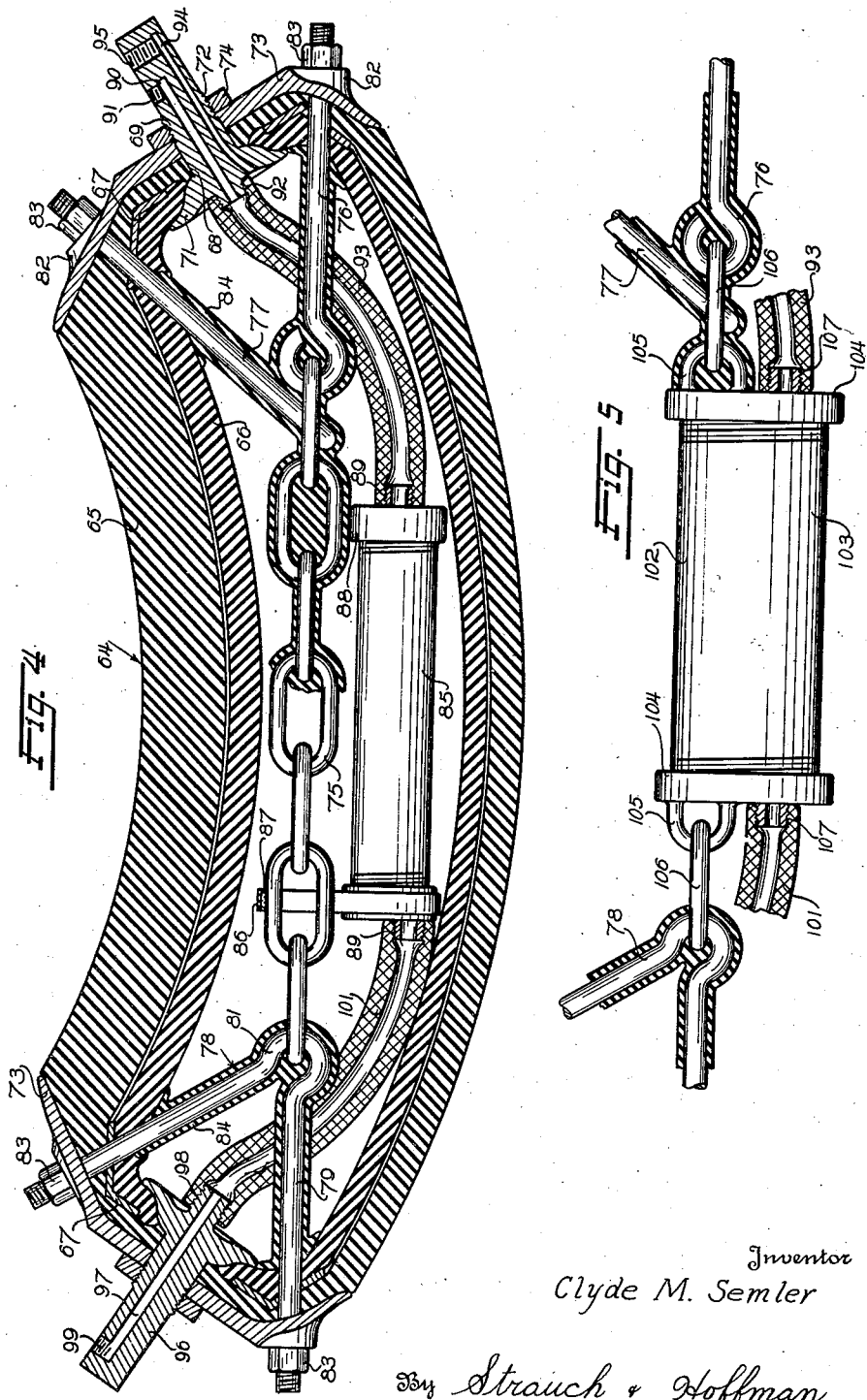

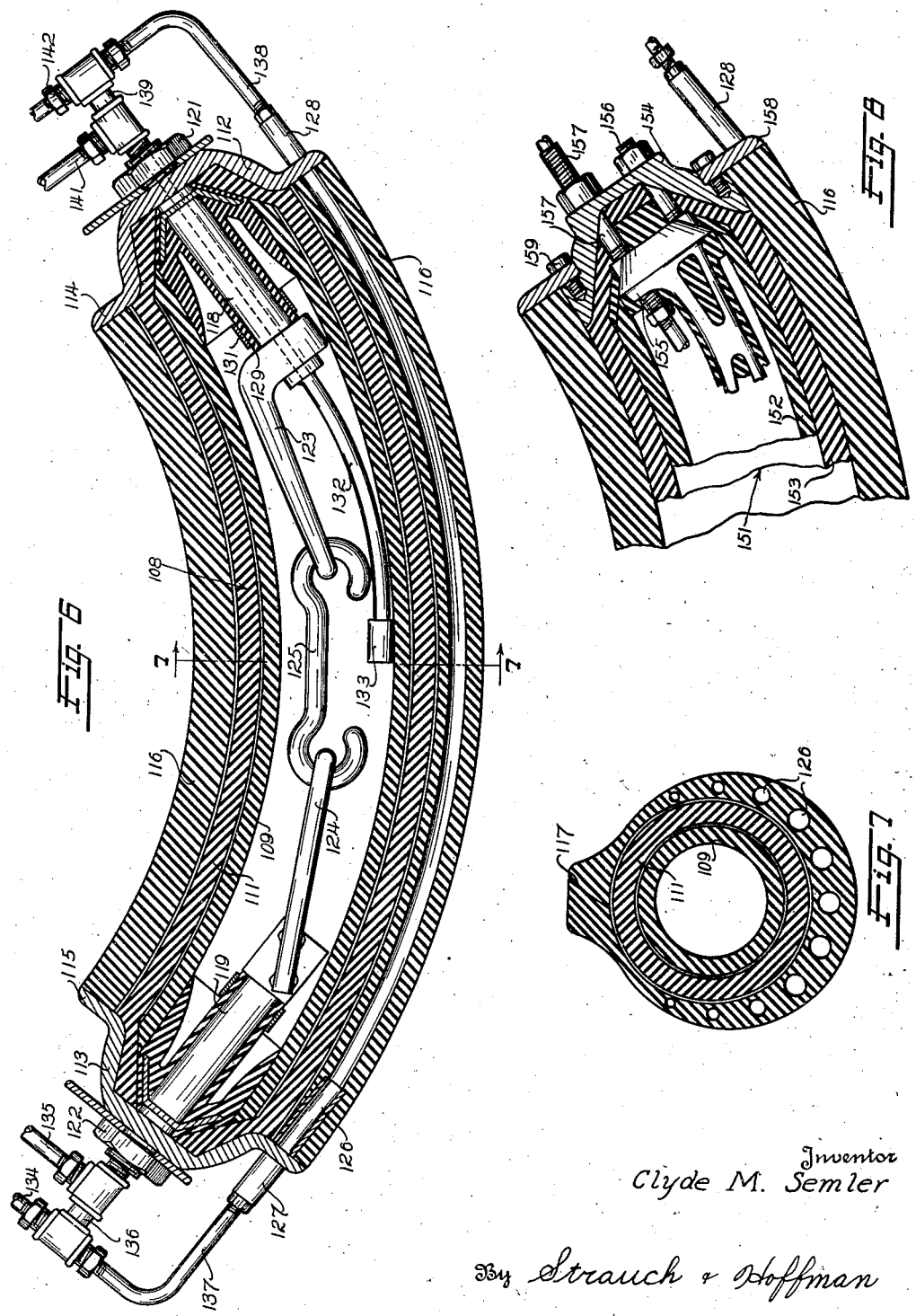

Patented May 9, 1944

2,348,229

UNITED STATES PATENT OFFICE 2,348,229

VULCANIZING APPARATUS

Clyde M. Semler, Cuyahoga Falls, Ohio

Application March 18, 1941, Serial No. 384,005

20 Claims. (Cl. 18—45)

This invention relates to vulcanizing apparatus for automobile tires and like casings and is more particularly concerned with pressure bags of special construction adapted to fit within the tire to be vulcanized.

This application is a continuation-in-part of my co-pending application Serial No. 182,316, filed December 29, 1937, wherein I have disclosed and claimed novel base bags equipped with removable external sleeves for adapting them to fit within tires of different internal diameters. The present application contemplates also improvements over the constructions illustrated in said application.

It is a major object of the present invention to provide a pressure bag for tire repair and like uses made up of a flexible expansible tubular body extending between opposed rigid end fittings, wherein the end fittings are flexibly interconnected in such manner as to prevent elongation of the bag and insure against blow-out of the bag when pressure is introduced thereinto. To this end I preferably provide a special anchor and chain device acting substantially centrally longitudinally through the bag and arranged to compensatively resist the forces tending to separate the end caps during expansion.

It is a further object of the invention to provide a novel pressure bag for tire repair and like purposes having a removable split sleeve mounted thereon for adapting it to fit the tire or casing to be repaired and novel end fittings especially adapted for restraining longitudinal movement of the removable sleeve along the bag.

A further object of the invention is to provide a pressure bag for tire repair and like purposes having novel rigid end fitting construction.

It is a further object of the invention to provide a pressure bag for tire repair and like uses having novel arrangements for heating the interior thereof.

It is a further object of the invention to provide a novel pressure bag for tire repair and like uses having a removable sleeve surrounding it and novel means for circulating heating fluid through the removable sleeve during normal use.

Further objects of the invention will presently appear as the description proceeds in connection with the appended claims and the annexed drawings in which:

Figure 1 illustrates in longitudinal section novel pressure bag end fitting and end fitting interconnecting constructions of a preferred embodiment of my invention;

Figure 2 is an end elevation of the bag of Figure 1;

Figure 3 is a section along line 3—3 in Figure 1;

Figure 4 illustrates in longitudinal section a base bag comprising a further embodiment of the invention wherein a different chain and anchor device for interconnecting the end fittings is employed and a special heater is supported mainly by the chain within the bag;

Figure 5 is a fragmentary view illustrating a construction wherein a heating element forms a link in the chain interconnecting the end fittings;

Figure 6 is a longitudinal section of a pressure bag comprising a still further embodiment of the invention and illustrating especially a system for circulating heating fluid in the removable sleeve;

Figure 7 is a section along line 7—7 of Figure 6 illustrating the heater tubes in the removable sleeve as extending down to the side walls of the tire to be repaired; and Figure 8 is a longitudinal section through a pressure bag comprising still another embodiment of the invention.

With reference to Figure 1, the preferred embodiment of my invention comprises a base bag 11 surrounded mainly by a removable sleeve 12. Base bag 11 includes essentially a longitudinally arcuate tubular body member 13 of rubber or like tough elastic material which is preferably cylindrical in cross-section with sufficiently thick walls to make it sturdy and capable of maintaining its shape even when the interior thereof is open to the atmosphere. Body member 13 is provided with end walls 14 and 15, which are integral therewith or vulcanized or otherwise secured thereto in pressure tight relation.

Sleeve 12 is preferably of rubber or an equivalent flexible elastic material, and its walls are sufficiently sturdy that the sleeve is capable of maintaining its shape even when separated from bag 11.

Opposite ends of base bag 11 are provided with rigid end fittings 16 and 17 which are fitted snugly against end walls 14 and 15 respectively.

End fitting 16 comprises two parts, an outer ring 18 which is of larger diameter than base bag 11 and is provided with a substantially smooth inner face 19 adapted to evenly contact the adjacent end of removable sleeve 12, and a central plate 20 secured to ring 18 as by a series of cap screws 21 and having an inner concave face snugly coextensive with the smooth convex exterior surface of end wall 14.

Both ring 18 and plate 20 are preferably relatively heavy metal castings designed to withstand the high pressures employed during vulcanizing operations for which the apparatus is intended.

End cap 16 is secured to bag 11 in the following manner. A substantially U-shaped anchor bolt 22 is disposed within the bag with a lower straight leg 23 extending through a closely fitting sleeve of rubber or like material 24 projecting inwardly from wall 14. Sleeve 24 is preferably integral with wall 14 and fits in pressure tight relation on leg 23. Leg 23 extends through a suitable aperture in wall 14 and then through a boss 25 formed on the outer face of plate 20. Beyond boss 25, the free end of leg 23 is threaded and carries a lock washer 26 and a nut 27.

At the inner end of leg 23 which is located well within bag 11, preferably about a quarter of the distance between the bag ends, anchor bolt 22 is provided with a leg 28 having an upwardly and outwardly inclined section 29 which extends through a closely fitting sleeve 30 of rubber or like material. Sleeve 30 is preferably integral with wall 14 and projects inwardly therefrom. Sleeve 30 is pressure tight with leg section 29. Beyond section 29, leg 28 is bent to provide an end section 31 parallel to leg 23 which projects through a suitable aperture in wall 14 and then through a suitable boss 32 in plate 29 exteriorly of fitting 16. Beyond boss 32, leg section 31 is threaded and provided with a lock washer 33 and a nut 34. When nuts 27 and 34 are tightened, fitting 16 is drawn into proper location against wall 14.

Sleeves 24 and 30 are preferably vulcanized to legs 23 and 28, respectively. To further insure that the connection between anchor bolt 22 and bag 11 is pressure tight, I provide sheet metal clamping rings 35 and 36 on sleeves 24 and 29 which are sufficiently tight to maintain the rubber therebeneath under compression thereby aiding the vulcanized joint between the bolt and the bag in preventing relative axial displacement of the legs of the bolt relative to the surrounding sleeve. This tight connection insures against escape of steam, air, or other fluid under pressure between the sleeves and the bolt legs.

At the other end of bag 11, end fitting 17 is substantially the same as fitting 16 and comprises an inner ring 37 and a central plate 38 secured thereto as by an annular row of cap screws 39. Ring 37 has an inner face 40 adapted to evenly contact the end of removable sleeve 12 opposite from face 18.

An anchor bolt 41, which is a substantial duplicate of anchor bolt 22 as above described, is carried by wall 15 at this end of bag 11. Bolt 41 has a lower leg 42, and an upper leg 43 comprising an upwardly and outwardly inclined section 44 and a bent terminal section 45 parallel to leg 42. Bolt and lock nut assemblies 46 and 47 secure fitting 17 upon anchor 41 and wall 15.

Rubber sleeves 48 and 49, similar to sleeves 24 and 29, are preferably vulcanized to anchor bolt 41, and compression bands 51 and 52 are provided on sleeves 48 and 49 to maintain the rubber compressed between them and the anchor bolts and thereby prevent escape of fluid under pressure at this end of the bag. Since the anchor bolt and end fitting construction at opposite ends of the bag is substantially identical, further description of this end of the bag is unnecessary.

Leg 42 of anchor bolt 41 and leg 23 of anchor bolt 22 are in axial alignment with each other, as are the parallel leg sections 31 and 45 of the respective anchor bolts. Anchor bolts 22 and 41 extend the same distance into the interior of bag 11, and are flexibly interconnected. This connection may comprise a single rigid link 53 as shown in Figure 1, or a multi-link chain as shown in Figure 4. Link 53 comprises a metal bar having an integral looped end 54 hooked by anchor bolt 41, and an integral looped end 55 hooked by anchor bolt 22.

Link 53 is located as centrally as possible longitudinally within bag 11 so as to be kept away from contact with the walls of body 13 at all times. The longitudinal axis of link 53 is parallel to legs 23 and 42 of the anchor bolts and is located as closely as practically possible in the same straight line therewith. This provides a substantially straight line pull through the bag between the end fittings, the advantages of which will later become apparent. If desired, bolts 22 and 41 may be formed at their inner ends with a loop similar to that at 81 in Figure 4 so as to insure that link 53 is exactly aligned with legs 23 and 42, but as a practical matter this is not essential as the arrangement shown in Figure 1 is the full mechanical equivalent of such for purposes of the invention.

Referring to Figures 2 and 3, plate 29 is circular, but ring 18 is shaped in substantial accord with the contour of removable sleeve 12. Sleeve 12 has a cylindrical interior surface 56 adapted to fit snugly about cylindrical body 13. The outer surface of sleeve 12 is generally pear-shaped to fit with the inside contour of the tire to be repaired. As shown in Figure 3, the lower or tread-backing wall of sleeve 12 is relatively thick while the wall thickness decreases along those portions of the sleeve which back the tire side walls. Sleeve 12 is thickened to provide a relatively solid bead contacting portion 57 which is longitudinally split as indicated at 58 to enable the sleeve to be longitudinally opened and removed from about bag 11 without removing either of rings 18 or 37.

As shown in Figure 2, ring 18 is correspondingly wide and narrow in conformance with the cross-section of sleeve 12, and is provided with a rigid bead portion 59 aligned with bead 57 of sleeve 12.

End fitting 17 as above explained is identical with fitting 16 just described, and it is not necessary to go into further detail with respect thereto.

For introducing fluid under pressure into the interior of bag 11, I preferably provide a tubular passage 61 drilled through leg 28 of anchor bolt 22. Passage 61 has an outlet 62 within the bag well beyond sleeve 30. The outer end of leg section 31 is formed with a tapped outlet 63 in which a suitable supply valve can be mounted for connection to a conduit for introducing the fluid under pressure to the interior of the bag. This construction enables me to insert the pressure fluid directly through the anchor bolt in a positively leak-proof manner, and does away with the necessity of providing an expensive inlet valve requiring a special expensive leak-proof connection with the walls of bag 11.

*Assembly of the tire bag*

In building bag 11, I first select a pair of solid cylindrical bars of metal of equal length to be bent into anchor bolts. One of these bars I form with the tubular passage 61, outlet 62 and the tapped inlet 63. Then both bars are bent to the identical anchor bolt shape illustrated in Figure 1. I then thread rubber sleeves 24 and 30 onto anchor bolt 22 and rubber sleeves 48 and 49 onto anchor bolt 41, to the approximate locations illustrated in Figure 1, and vulcanize the sleeves to the bolts. Care is taken that sleeve 30 does not obstruct outlet 62. Preferably the surface of the bolts beneath the rubber sleeves is brass plated to aid the vulcanizing operations. I then attach compression bands 35, 36 and 51, 52 which are simply sheet metal bands clamped tightly about the sleeves by a pair of cylindrically jawed pliers or the like.

Then the bolts are threaded through opposite ends of link 53 and the link and anchor bolt assembly is inserted into bag 11 through a suitable slit (not shown) in body 13. Bag 11 comprising body 13 and end walls 14 and 15 is preferably made in a single molding operation during which the end walls are provided with suitable apertures through which the bolt legs pass. The slit in body 13 and the joints between the rubber sleeves and walls 14 and 15 are all vulcanized tightly shut at this stage. In this manner sleeves 24, 30, 48 and 49 are made substantially integral with the body and walls of bag 11 and the walls of bag 11 are made tight against leakage of pressure to the atmosphere.

Bag 11 now comprises a leak-proof rubber container having anchor bolts sealed therein at opposite ends. The anchor bolts are interconnected within the bag and have legs projecting from the bag ends for attachment of end fittings 16 and 17. Ring 18 and plate 20 are secured together by cap screws 21 to form complete fitting 16, and fitting 16 is then secured upon the end of bag 11 by locating bosses 25 and 32 over the legs of bolt 22 and fastening nuts 27 and 34. Fitting 17 is assembled and attached to the other end of the bag in an equivalent manner.

The apparatus can be made ready for use in vulcanizing operations by attachment of a sleeve 12 of suitable size for the job in hand, and provision of a suitable inlet valve at 63.

The invention is of sufficient scope to cover any manner of sealing the anchor and link assembly within bag 11. For example each half of the bag on opposite sides of the section line 3—3 in Figure 1 can be separately made and placed on the anchor bolt and link assembly, and then the adjacent edges of the bag halves can be vulcanized together in the manner the usual tire inner tube is fashioned.

*Operation and use*

Bag 11 is provided with a sleeve 12 of correct external size and shape for the job at hand, and the apparatus is placed within the tire or other casing to be repaired. Fluid under pressure, compressed air or steam in the embodiment of Figure 1, is introduced through passage 61 into the interior of bag 11. As bag 11 expands radially it fits snugly with surface 56 of sleeve 12 which thereby controls to some extent such expansion of the bag. Sleeve 12 in turn is forced by expansion of bag 11 into intimate surface contact with the interior walls of the tire. Slit 58 aids in permitting whatever circumferential expansion of sleeve 12 may be necessary to accommodate it to the tire.

The pressure within bag 11 also tends to expand the bag longitudinally and thereby force the end fittings outwardly. This tendency of the bag to straighten and elongate is resisted by the anchor bolt and link assembly and end fitting arrangements. As shown in Figure 1, these arrangemments comprise a flexible connection which extends substantially straight through the bag and cannot be elongated. It will be appreciated that, as the pressure inside bag 11 increases, the whole bag assembly is permitted to straighten to a less arcuate condition since it is free to assume its correct position in conformance with curvature of the tire.

Moreover, the lumpy repair section within the tire beneath the apparatus is in contact with the lower central surface of sleeve 12. As the bag and sleeve expand, this repair section resistively acts substantially as a fulcrum causing the bag ends to rock downwardly toward the tire tread. If the end caps were tied together by an ordinary chain only, as in Wheelock Patent No. 1,625,383, the upper edges thereof would rock outwardly of the bag and the inner edges thereof would rock inwardly of the bag with the result that the end caps would tend to be separated from the bag at its upper edges and, thus weakened, the bag would easily blow out.

In my above-described apparatus, these changes in form of the bag are accompanied by a swiveling motion of the end fittings about their points of connection with the ends of link 53. This motion of the end fittings is directly controlled by the forces acting from within bag 11. Since the anchor bolts tie the top and bottom of each fitting rigidly together, this swiveling action prevents separation of the end caps and body 13 and, far from lengthening the bag axially, actually tends to shorten the bag slightly. In this specification I refer to that portion of the bag adjacent the tire tread as the bottom of the bag, and that portion at the tire bead as the top of the bag. The result of the above-described construction and operation is that the bag is permitted to freely radially expand and longitudinally deform until it finds its correct position within the tire, and the end fittings by reason of their swivelling action follow the bag ends toward the tire tread section and insure the same rigid straight-line resistance against elongation of the bag during all operating conditions of the apparatus.

My above-described tire repair apparatus is sturdy and efficient, and inexpensive to make and use. It is positively reinforced against elongation during all conditions of operation as above explained. My apparatus dispenses with the use of expensive cord reinforcements hitherto considered necessary in the walls of tire bags, especially at the points of attachment to the end fittings. I preferably use an all-rubber bag 11 which is less expensive and easier to make than a cord reinforced bag.

Attempts have previously been made to employ all rubber bags in tire bag apparatus, but they have blown out, mainly adjacent the end caps, when subjected to appreciable pressures. In my construction, rings 18 and 37, besides locating the removable sleeve 12, also prevent blowout of bag 11. When the bag is expanded, its walls push sleeve 12 outwardly against the tire which restricts further expansion in that direction. Extension rings 18 and 37 then prevent longitudinal expansion of the end walls of bag 11, and the latter is thereby held aaginst blowout in any direction.

Different sizes of extension rings 17 and 38 are available for different sizes of sleeves 12, and may be exchanged without removing the entire end fittings.

*Heater bags*

A further embodiment of my invention is illustrated in Figures 4 and 5 and comprises a base bag 64 of sufficient rigidity to maintain its shape even when open to the atmosphere. Bag 64 is made up of an external sleeve 65 and an internal sleeve 66 secured in pressure-tight relation, as by vulcanization, to sleeve 65 at adjacent ends only. Between its ends, sleeve 66 is free to expand against the inner periphery of sleeve 65. Sleeves 65 and 66 are preferably of rubber or like tough elastic material.

Rigid annular cups 67, preferably of metal and concentric with the sleeves, are entirely imbedded in the rubber at the vulcanized joints between the sleeve ends.

Bag 64 is formed at one end with an aperture 68 of reduced size through which extends a fitting 69 having an enlarged flange 71 disposed inside sleeve 66 and a threaded portion 72 exteriorly of the bag. A suitable rigid end cap 73 apertured to slide over fitting 69 fits over the end of the bag. If desired the two-piece end fittings of Figure 1 can be employed on this bag as it is intended to serve as a base bag for a removable sleeve in the manner of sleeve 12 in Figure 1. Fitting 69 is securely held in place by tightening nut 74 on threaded portion 72 thus compressing flange 71 against the end wall of sleeve 66. Any suitable means may be provided at aperture 68 for insuring against leakage of fluid from within sleeve 66. Flange 71 may be adhesively secured to sleeve 66, suitable packing material may be used to form a tight joint, or a suitable packing gland construction such as that disclosed in my co-pending application may be used.

A chain 75, disposed inside sleeve 66, has its opposite ends connected to suitable anchor bolt devices either of which may be in the form of a pair of angularly arranged eye bolts 76 and 77 or a single V-shaped bolt 78. Lower bolt 76 and the lower leg 79 of bolt 78 are arranged in the same straight line. Bolt 78 is formed at its apex with a symmetrical loop 81 engaging the adjacent end of chain 75. In this manner, I provide a straight pull between the end fittings, which swivel about the chain ends as the bag expands, similarly to the apparatus of Figure 1. Bolts 76, 77 and 78 project externally of the bag end through hollow bosses 82 adjacent the outer periphery of the end caps. Nuts 83 fitted to the threaded ends of the bolts are tightened to securely hold the end caps in place on the bag ends.

Bolts 76, 77 and 78 may be secured in any desired manner, as by vulcanizing, to the bag. Cup 67 provides a rigid support for the bolts intermediate their ends but, if desired, it may be omitted altogether.

Preferably those portions of anchor bolts 76, 77 and 78 inside sleeve 66 are covered by layers of rubber 84 which also seal off the apertures through which the bolts enter the bag to prevent escape of fluid therefrom. Rubber layers 84 also act as heat insulation to prevent heat from chain 75 from being conducted through the bolts exteriorly of the bag. If desired, chain 75 may be covered with rubber as shown at the right in Figure 4 but such is not necessary if heat insulating material is disposed between the chain and the anchor bolts as shown at the left in Figure 4.

A heating unit comprising a cylindrical tube or pipe 85 of large diameter to present ample heating surface is preferably suspended by a hanger 86 from chain 75. Hanger 86 may be provided with heat insulating material 87 where it contacts chain 75 and tube 85. Tube 85 is threaded at each end to receive end caps 88 each of which is proivded with a projecting threaded nozzle 89 having a passage communicating with the interior of tube 85. One of these nozzles is disposed adjacent the bottom edge of tube 85 for a purpose to be later described.

Fitting 69 is provided with a longitudinal passage 90 leading from an exterior threaded aperture 91 to an externally threaded nozzle 92 on fitting 69 inside sleeve 66. A flexible conduit 93 extends between nozzles 89 and 91. Fitting 69 is also provided with a longitudinal passage 94 leading from an external nozzle connection 95 to the interior of sleeve 66.

At the other end of the bag, the end construction is the same as above described with the exception that fitting 96 has only one passage 97 leading from a threaded nozzle 98 inside sleeve 66 to an exterior nozzle connection at 99. Flexible conduit 101 connects nozzle 98 with lower nozzle 89.

If desired, heater 85 may be supported rigidly within sleeve 66 in some suitable manner as by attachment to the anchor bolts or by making conduits 93 and 101 rigid.

In operation, bag 64 is inflated by introducing a suitable fluid, preferably water, under pressure through passage 94 into the interior of sleeve 66. Heat is provided internally of the bag by admitting a suitable heating fluid such as steam through passage 90 into tube 85. Since tube 85 is located at the bottom of sleeve 66 an effective circulation of water is obtained within the sleeve due to convection currents. This circulation tends to transfer heat quickly and effectively from the heating unit to the sleeve walls. Condensate from the steam in tube 85 will collect upon the bottom and is drained off through conduit 101 and passage 97.

The chain and anchor bolt construction abovedescribed prevents longitudinal expansion of the bag, and the stresses set up in the bolts upon inflation of the bag are evenly distributed upon opposite sides of the end caps.

The tire bag of Figure 4 may be used as a fluid pressure bag without heating means merely by omitting the heating unit 85 and supplying air or water under pressure through a suitable fitting in aperture 68. The opposite end of the bag would then be sealed tight.

If desired, the bag of Figure 4 could be used as a steam bag by omitting heater 85 and conduit 93 and sealing off passage 94. In such a modification, the free end of condensate conduit 101 would be held at the bottom of the sleeve by a weight or some other suitable means.

Heating unit 85 may contain an electrical heating coil using the described steam passages as electrical wire conduits.

In Figure 5 is disclosed a form of heating unit which may be used in the bag of Figure 4. Instead of suspending the unit from the chain, as in Figure 4, the unit designated at 102 is inserted as a link in the chain. Unit 102 comprises a cylindrical pipe 103 of much larger diameter than pipe 85, threaded at opposite ends to receive end caps 104. Each end cap 104 is provided adjacent its top edge with an axially extending apertured ear 105 and this ear is connected by one or more chain links 106 to anchor bolts 76, 77 and 78. Near their bottom edges, caps 104 are provided with nozzles 107 similar to nozzles 89 for the passage of steam.

The construction shown in Figure 5 is quite effective in that it provides a very large heating surface area within the bag and effectively eliminates the need for a long chain. Furthermore, with a large heater whose surfaces are near the sleeve walls, the transfer of heat is speedy and efficient.

A further embodiment of my invention is illustrated in Figures 6 and 7 wherein base bag 108 is made up of concentric rubber sleeves 109 and 111 vulcanized to each other and to metal end caps 112 and 113 at opposite ends. Caps 112 and 113 are formed with integral annular extension flanges 114 and 115, respectively, abutting opposite ends of a removable sleeve 116 loosely mounted on bag 108. Like sleeve 12, sleeve 116 is longitudinally slit at 117 along its bead portion to permit speedy removal from about the bag.

A pair of large metal conduits 118 and 119 are secured to end caps 112 and 113, respectively, as by nuts 121 and 122. Conduits 118 and 119 each extend a substantial distance into the interior of bag 108, and are provided at their inner ends with inwardly projecting anchor bars 123 and 124 which in turn are swively interconnected by a chain link 125.

The walls of sleeve 116 contain a plurality of interconnected passages 126, preferably comprising a long flexible metal tube distributed sinuously from end to end of the sleeve and having an inlet fitting 127 rigid with flange 115 and an outlet fitting 128 rigid with flange 114. As shown in Figure 7, passages 126 extend down to the side wall sections of the tire to be repaired.

Conduit 118, within bag 108, extends through a rubber sleeve 129 to which it is vulcanized and is provided with a compression band 131, similar to that at 35 in Figure 1. The connection between conduit 119 and the other end of bag 108 is made similarly pressure tight.

The inner end of conduit 119 opens to the interior of bag 108. The inner end of conduit 118, however, is reduced for attachment of a short flexible conduit 132. The free end of conduit 132 is provided with a heavy weight 133 which insures that the open end of conduit 132 always lies close to the bottom of bag 108.

Pipes 134 and 135, from a common supply of steam or like hot fluid under pressure, are attached to a branched steam fitting 136 on end cap 113. Some of the steam passes into conduit 119 and thence to heat the interior of bag 108. Some steam also passes through a bent pipe 137 to inlet 127 for delivery to sleeve 116.

At the other end of the bag, outlet 128 is connected by a bent pipe 138 to a steam fitting 139 on cap 112. Fitting 139 is likewise open to the outer end of conduit 132 which drains condensate from the bottom of bag 108. Pipes 141 and 142 lead from fitting 139 to a common discharge reservoir.

The above-described arrangement insures circulation of the heating fluid and high heat in sleeve 116, and continuous removal of condensate from bag 108.

Figure 8 illustrates a further embodiment of my invention wherein a base bag 151 is made up of concentric rubber sleeves 152 and 153 vulcanized at opposite ends to each other and end caps 154, similar to bag 64. A suitable chain anchor device 155 is secured to cap 154, as by bolt and nut assembly 156, and supports a heating fluid passage conduit 157.

A suitable conduit system like that of Figure 6 is provided for supplying and withdrawing steam from the interior of bag 151 and passages in removable sleeve 116.

Each cap 154 is shouldered externally for seating an extension ring 158 which is removably secured thereto, as by cap screws 159.

The internal heater systems of Figures 4-8 and the removable sleeve heater systems of Figures 6-8 can be employed with the apparatus of Figure 1 without departing from the scope of the invention. Similarly the removable heater sleeve of Figures 6-8 can be used on the base bag of Figure 4 or any equivalent base bag in like manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for treating a tire or like casing comprising an expansible arcuate tubular bag having sufficient rigidity to normally retain its shape when its interior is open to the atmosphere, rigid end caps at opposite ends of said bag and means extending through said bag interconnecting said end caps to prevent elongation of said bag during expansion while permitting limited rocking movement of said caps, means for introducing fluid under pressure within said bag, a removable expansible sleeve mounted loosely on said bag, said sleeve being of sufficient rigidity to normally retain its shape independently of said bag and having its external surface shaped in accordance with the casing to be treated, and means extending outwardly from said end caps preventing substantial longitudinal displacement of said sleeve relative to said bag and controlling longitudinal expansion of said bag upon said movement of the caps.

2. In the apparatus defined in claim 1, said last-named means comprising generally radial rigid extensions on said end caps.

3. In the apparatus defined in claim 1, said last-named means comprising generally radial extensions on said caps, with at least one of said extensions being removable from its associated cap.

4. In the apparatus defined in claim 1, said last-named means comprising extension rings rigid with said end caps and arranged in abutting relation with the ends of said sleeve, and said sleeve being longitudinally split for removal without removing either of said rings.

5. Apparatus for treating a tire or like casing comprising an expansible tubular bag, rigid end fittings at opposite ends of said bag, means extending through said bag interconnecting said fittings to prevent elongation of said bag when expanded while permitting rocking of said fittings, means for introducing fluid under pressure within said bag, and a removable sleeve loosely mounted on said bag, each of said end fittings comprising a plate fitting snugly with the adjacent end of said bag and a rigid extension ring arranged in abutting relation with the adjacent end of the sleeve whereby the relation of said bag to said sleeve is maintained upon said rocking of the fittings.

6. In the apparatus defined in claim 5, said rigid extension ring being separable from said plate.

7. Apparatus for treating a tire or like casing comprising an expansible arcuate tubular bag, rigid end fittings on said bag, a removable sleeve loosely mounted on said bag, rigid extensions on said fittings abutting opposite ends of said sleeve, a plurality of interconnected passages in said sleeve, and conduit means including branches respectively supplying heating fluid from a source simultaneously to the interior of said bag and for circulation through said passages.

8. Apparatus for treating a tire or like casing comprising an expansible tubular bag having sufficient rigidity to normally retain its shape when its interior is open to the atmosphere, rigid end caps on said bag, means for introducing fluid under pressure within said bag, and means extending through said bag interconnecting said end caps to prevent elongation of said bag comprising a longitudinal member and separate anchor devices flexibly connected with the opposite ends of said member, each of said anchor devices being secured to the adjacent end cap at spaced points on opposite sides of the axis of said bag, thereby enabling and causing said end caps to freely follow the associated bag ends as the bag changes in form during expansion to assume its correct position within said casing, said means insuring that the end caps remain in the same reinforcing relation to the bag ends during all normal conditions of operation and said means also being of such construction as to maintain a substantially straight-line connection between said end caps during said conditions.

9. In the apparatus defined in claim 8, a removable expansible sleeve on said bag and rigid extensions on said end caps at opposite ends of said sleeve, said sleeve controlling radial expansion of said bag and said extensions aiding in prevention of longitudinal expansion of said bag.

10. Apparatus for treating a tire or like casing comprising an expansible arcuate tubular bag having sufficient rigidity to normally retain its shape when its interior is open to the atmosphere, means for introducing fluid under pressure within said bag, rigid end caps on said bag, flexible means extending through said bag providing a substantially straight-line non-elongatable connection between said end caps, said flexible means comprising a pair of anchor assemblies each secured to one of said end caps at spaced points thereof and extending well into the interior of said bag and link means held out of contact with the bag walls interconnecting said anchor assemblies, and means for introducing fluid under pressure within said bag, said end caps swiveling about their points of connection with said link means to follow and reinforce the bag ends as said bag changes its form to assume its correct position within the casing to be treated, and said means retaining said straight-line connection during all normal conditions of operation.

11. In apparatus for treating a tire or like casing, an expansible tubular arcuate bag, rigid end caps at opposite ends of said bag, and means extending through said bag interconnecting said end caps to prevent elongation of said bag comprising an anchor assembly rigid with each end cap and link means interconnecting said anchor assemblies, each of said anchor assemblies comprising at least a pair of angularly disposed rigid legs connected to the associated end cap adjacent the top and bottom edges thereof, respectively, with one leg of each assembly arranged in substantial longitudinal alignment with the corresponding leg of the other assembly, and said link means extending between the inner ends of said aligned legs.

12. In apparatus for treating a tire or like casing, an expansible tubular arcuate bag, rigid end caps at opposite ends of said bag, and means extending through said bag interconnecting said end caps to prevent elongation of said bag comprising an anchor assembly rigid with each end cap and link means interconnecting said anchor assemblies, each anchor assembly comprising an integral bolt having an intermediate portion within the bag pivotally attached to said link means and spaced legs projecting from said intermediate portion through the adjacent end wall of the bag, means sealing said bolts in pressure tight relation with said bag, and means securing said legs rigidly to the associated end caps.

13. In the apparatus defined in claim 12, said legs being attached respectively adjacent the upper and lower edges of said end caps, with the lower legs being substantially longitudinally aligned.

14. In the apparatus defined in claim 12, means for introducing fluid under pressure through one of said anchor bolts to the interior of said bag.

15. In the apparatus defined in claim 12, a substantially radial removable extension ring on said cap.

16. In apparatus for treating a tire or like casing, an expansible tubular bag having a rigid end assembly comprising a rigid end cap, an integral anchor bolt having an intermediate portion within said bag and spaced legs extending externally of said bag, parallel end sections on said legs rigidly secured to said cap, and means sealing said legs in pressure tight relation with said bag.

17. In apparatus for treating a tire or like casing, an expansible tubular rubber bag, a rigid end cap on said bag, a rigid member having a portion disposed within said bag and extending through an aperture in said bag and secured to said end cap, and means sealing said member in pressure tight relation with said bag comprising a compressible rubber sleeve surrounding a portion of said member and bonded permanently to said bag and said member, and a band tightly secured about said sleeve adjacent its end remote from said cap where the latter is bonded to said member for maintaining the rubber of said sleeve therebeneath under compression whereby a sturdy fluid tight seal is effected and maintained between said member and said sleeve.

18. In a tire curing bag, an expansible sleeve, anchor means secured at each end of said sleeve, flexible means extending between said anchor means through said sleeve to limit the longitudinal expansion of said sleeve, means for heating the interior of said sleeve and means providing heat insulation between said heating means and said anchor and flexible means.

19. A tire repair bag comprising an arcuate expansible sleeve having rigid caps at opposite ends thereof, anchor means within each end of said sleeve rigid with said end caps, said anchor means each comprising a plurality of legs rigid with the adjacent end cap and extending from spaced portions of the end cap toward the axis of said sleeve and a linked chain extending between the inner ends of said anchor means, said anchor means extending sufficiently inwardly of said sleeve to insure against contact of said chain with said sleeve during expansion of said sleeve.

20. In the apparatus defined in claim 8, said expansible tubular bag being made entirely of rubber.

CLYDE M. SEMLER.